United States Patent [19]

Uchida et al.

[11] Patent Number: 4,763,960
[45] Date of Patent: Aug. 16, 1988

[54] ANTISKID TYPE BRAKE SYSTEM FOR VEHICLES

[75] Inventors: Kiyoyuki Uchida; Michio Akiyoshi, both of Susono, Japan

[73] Assignee: Toyota Jidosha Kabushiki Kaisha, Toyota, Japan

[21] Appl. No.: 927,108

[22] Filed: Nov. 5, 1986

[30] Foreign Application Priority Data

Nov. 25, 1985 [JP] Japan .................. 60-264174

[51] Int. Cl.$^4$ .................. B60T 8/74; B60T 8/58; B60T 8/68
[52] U.S. Cl. .................. 303/97; 303/100; 303/105; 303/109; 303/111
[58] Field of Search ............ 303/3, 20, 100, 103, 303/106, 107, 108, 109, 110, 111, 95, 96, 97; 364/426; 188/181 A

[56] References Cited

U.S. PATENT DOCUMENTS 3,910,644 10/1975 Packer .................. 303/109
3,944,291 3/1976 Lindemann et al. .................. 303/100
3,972,568 8/1976 Fleischer .................. 303/100
4,270,810 6/1981 Ruhnau et al. .................. 303/110
4,402,047 8/1983 Newton et al. .................. 303/100
4,635,031 1/1987 Blomberg et al. .................. 303/96 X

FOREIGN PATENT DOCUMENTS 58-26661 8/1983 Japan .

Primary Examiner—Andres Kashnikow
Assistant Examiner—Timothy Newholm
Attorney, Agent, or Firm—Oblon, Fisher, Spivak, McClelland & Maier

[57] ABSTRACT

An antiskid type brake system for vehicles including brakes, actuators, rotation sensors for monitoring the speeds of rotation of wheels, a controller, fluid pressure sensors and an upper limit value setter. The upper limit value setter sets an upper limit value of deceleration in such a manner that the upper limit value is set at a high level when the fluid pressure is high and at a low level when the fluid pressure is low, based on the fluid pressure sensed by the fluid pressure sensor associated with a wheel whose speed of rotation has been determined by the associated rotation sensor to be the highest of all the speeds of rotation of the wheels.

3 Claims, 6 Drawing Sheets

ANTISKID TYPE BRAKE SYSTEM FOR VEHICLES

BACKGROUND OF THE INVENTION (1) Field of the Invention

This invention relates to an antiskid type brake system for vehicles which is suitable for use in applying the brakes to a vehicle while avoiding the skidding of its wheels.

(2) Description of the Prior Art

Antiskid type brake systems are used nowadays for the purpose of applying the brakes to vehicles in as short a distance as possible without spoiling the stability of the vehicle in travel. An antiskid type brake system usually comprises brakes hydraulically actuated to check the rotation of wheels, actuators for increasing and decreasing the hydraulic pressure of the brakes, rotation sensors for monitoring the speeds of rotation of the wheels and a controller for estimating the slipping conditions of the wheels based on their speeds of rotation sensed by the rotation sensors to thereby control the actuators. The controller is usually constructed and operates such that, by assuming that the speed of rotation of the wheel of the plurality of wheels whose speed of rotation is the highest represents the vehicle speed, it estimates the vehicle speed by fixing the deceleration of the wheel whose speed of rotation is the highest as a predetermined upper limit value after the deceleration has exceeded the upper limit value so as to estimate the slipping condition of each wheel based on the difference between the estimated vehicle speed and the speed of rotation of each wheel.

It is possible to fix the upper limit value of deceleration as the highest deceleration predicted for the automotive vehicle. In actual practice, however, the lower the coefficient of friction of a road surface, the lower is the level at which the upper limit value of deceleration of a vehicle is set. In this connection, a new proposal has been made in Japanese Patent Unexamined Publication No. 26661/83 to alter the upper limit value of deceleration in accordance with the actual conditions in which the brakes are being applied. More specifically, it is proposed that the speed of rotation of a wheel which is the highest of all the speeds of rotation of a plurality of wheels of a vehicle be determined the instant the deceleration of this wheel exceeds the upper limit value of deceleration, and that the deceleration of the vehicle be estimated at a point in time when the speed of rotation of any other wheel recovers the next time, based on the sloping of a straight line connecting the speed of rotation of the wheel of the highest speed of rotation with a maximum value of the speed of rotation that recovered, so that the estimated deceleration can be used as an upper limit value the next time when it becomes necessary to fix the deceleration to the upper limit value. When this proposal is adopted, it would be possible to estimate the vehicle speed with increased accuracy and consequently to effect antiskid control of the automotive vehicle with increased precision.

However, some disadvantage are associated with this proposal. In this system, each time the deceleration of a wheel of the plurality of wheels whose speed of rotation is the highest exceeds the upper limit value and the need arises to fix the deceleration to an upper limit value, an upper limit value to which the deceleration is to be fixed when the same need arises the next time is estimated. Thus, when the need arises to fix the deceleration for the first time, an estimated deceleration has not yet been obtained. Therefore, a maximum deceleration forecast for the automotive vehicle as in the prior art would have to be used as an upper limit value for the first time. As a result, when the coefficient of friction of the road surface is so low that a high deceleration is unobtainable, an estimated vehicle speed would be at variance with the actual vehicle speed, making it impossible to effect antiskid control with a high degree of precision.

SUMMARY OF THE INVENTION

This invention has as its object the provision of an antiskid type brake system for vehicles which is capable of effecting antiskid control with such a high degree of precision that an estimated traveling speed of a vehicle is not at variance with the actual traveling speed even when a road surface has a low coefficient of friction.

According to the invention, there is provided an antiskid type brake system for vehicles comprising a plurality of brakes each mounted to one of a plurality of wheels and actuated hydraulically, a plurality of actuators each mounted to one of the brakes or a plurality of brakes for increasing and decreasing the fluid pressures of the brakes, a plurality of rotation sensors at least one of which is mounted for each one of the plurality of actuators for monitoring the speed of rotation of each wheel, a controller normally assuming that the highest speed of rotation of all the speeds of rotation monitored by the rotation sensors represents the traveling speed of a vehicle and estimating, after the deceleration of the highest speed of rotation has exceeded a predetermined upper limit value, the traveling speed of the vehicle by fixing the vehicle deceleration as the upper limit value while controlling each actuator by estimating the slipping condition of each wheel based on the difference between the estimated traveling speed of the vehicle and the speed of rotation of each wheel to avoid the skidding of at least one of the wheels associated with the actuators, a plurality of fluid pressure sensors each monitoring a fluid pressure supplied from each actuator to the respective brake and generating an electric signal changing at least in two stages in accordance with the level of the fluid pressure and upper limit value setting means for setting an upper limit value of deceleration in such a manner that the upper limit value is set at a high level when the fluid pressure is high and at a low level when the fluid pressure is low, based on the fluid pressure sensed by the fluid pressure sensor associated with a wheel whose speed of rotation has been determined by the associated rotation sensor to be the highest of all the speeds of rotation of the wheels.

The upper limit value setting means may function such that it sets an upper limit value based only on the brake fluid pressure of the wheel of the highest speed of rotation. Alternatively, it may function such that it sets an upper limit value also by taking into consideration the brake fluid pressure of other wheel than the wheel of the highest speed of rotation at a time when the deceleration of such wheel exceeded the upper limit value.

In a preferred modification of the embodiment, the antiskid type brake system may comprise, in addition to the brakes, actuators, rotation sensors, controller, fluid pressure sensors and upper limit value setting means, pressure reducing time setting means for setting a period of time during which the controller continuously issues a command to reduce pressure to each actuator in such a manner that such period of time is short when the fluid pressure of each brake is high at the time the pressure reducing command is initially issued and long when the fluid pressure of each brake is low at such time.

In the embodiment of the brake system in conformity with the invention, the upper limit value setting means is operative to repeatedly set the upper limit value in accordance with the fluid pressure of the brake for the wheel of the highest speed of rotation while the brakes are being applied, and, after the deceleration of the wheel of the highest speed of rotation has become equal to the upper limit value set as aforesaid, the controller estimates the traveling speed of the vehicle by fixing the vehicle deceleration as the upper limit value. The higher the coefficient of friction of a road surface, the higher becomes the braking fluid pressure at a time when the deceleration of the wheel of the highest speed of rotation exceeds the upper limit value. Thus, by setting an upper limit value based on the high braking fluid pressure, it is possible to set the upper limit value at a suitable level in conformity with the coefficient of friction of the road surface. The deceleration is not fixed to an upper limit value set previously as described in the prior art document referred to hereinabove but fixed, when the need arises, to an upper limit value which has been set by the upper limit value setting means. Thus it is possible to fix, when the need arises for the first time to fix the deceleration, it at an upper limit value set in accordance with the coefficient of friction of the road surface. This is conducive to increased precision with which the traveling speed of a vehicle is estimated and therefore enables antiskid control to be effected with increased precision when the brakes are applied.

When the upper limit value of deceleration is set by taking into consideration the fluid pressures of other wheels than the wheel of the highest speed of rotation that are stored in fluid pressure memory means, it is possible to estimate the traveling speed of a vehicle with a high degree of precision even when there is a great difference in braking force between the left and right brakes. Assume, for example, that a vehicle is traveling on a road surface which differs greatly in the coefficient of friction between left and right sides thereof. In this case, the braking forces applied to the wheels traveling on the side of the road surface which is lower in the coefficient of friction are restricted to a low level, so that the deceleration actually achieved is also low. However, if the upper limit value of deceleration is set by taking into consideration the braking fluid pressures applied to the wheels to which reduced braking forces are applied, it is possible to estimate the travelling speed with a further increased degree of precision.

In the preferred modification of the aforesaid embodiment of the invention, the time at which, after the slip of the wheels has increased and the braking fluid pressures have been reduced, a decision is made as to whether the fluid pressures should be maintained at the prevailing levels or increased, can be varied in conformity with the levels of the fluid pressures. It is thus possible to increase the results achieved in effecting antiskid control when the brakes are applied. The period of time required for reducing a fluid pressure a suitable amount may vary depending on the level of the braking fluid pressure. However, by virtue of the fluid pressure sensors, it is possible to set the period of time for reducing each braking fluid pressure at a suitable level.

DESCRIPTION OF THE PREFERRED EMBODIMENTS

Preferred embodiments of the invention will now be described in detail by referring to the accompanying drawings.

Figure 1:
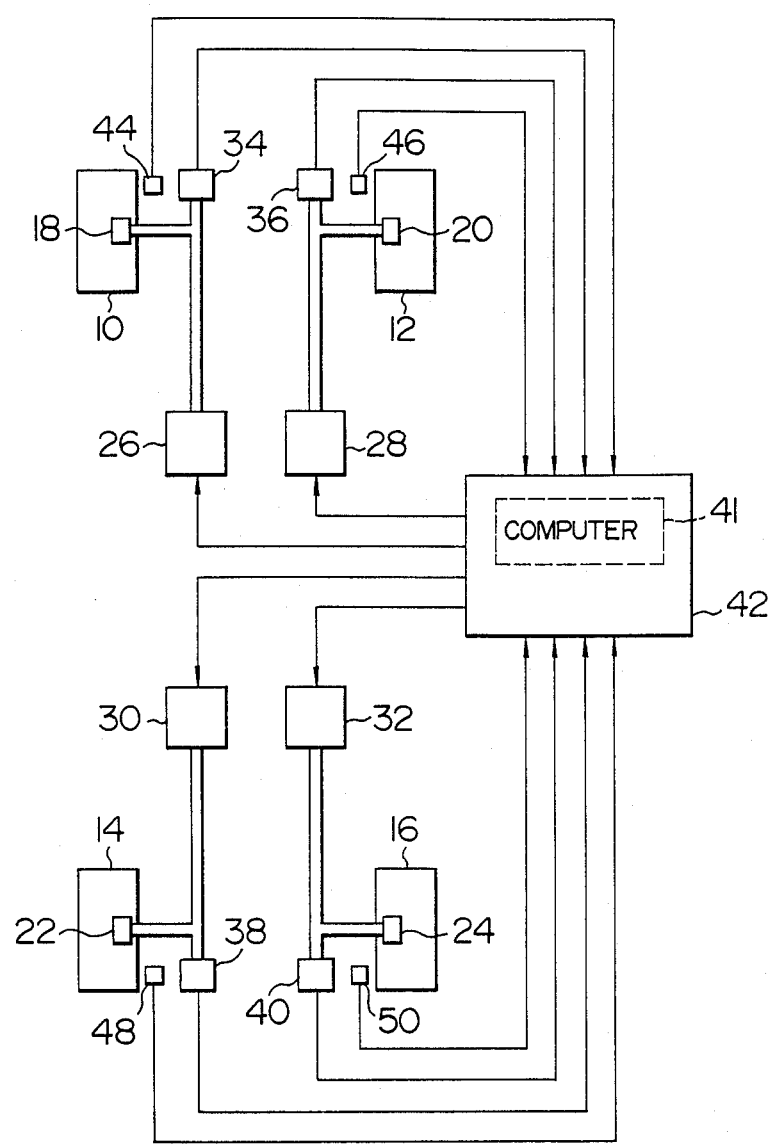
FIG. 1 is a systematic view of one embodiment of the antiskid type brake system for automotive vehicles in conformity with the invention.

FIG. 1 is a systematic view of one embodiment of the invention which is incorporated in an antiskid type brake system for a four-wheel automotive vehicle. The automotive vehicle comprises a front left wheel 10, a front right wheel 12, a rear left wheel 14 and a rear right wheel 16. Brakes 18, 20, 22 and 24 are mounted to the wheels 10, 12, 14 and 16 respectively. Fluid pressures for the brakes or fluid pressures of brake cylinders for actuating the brakes are increased or decreased by actuators 26, 28, 30 and 32 and sensed by fluid pressure sensors 34, 36, 38 and 40. The actuators 26, 28, 30 and 32 are controlled by a control unit 42 of which a computer 41 constitutes a principal part. Rotation sensors 44, 46, 48 and 50 are connected to the control unit 42.

Figure 2:
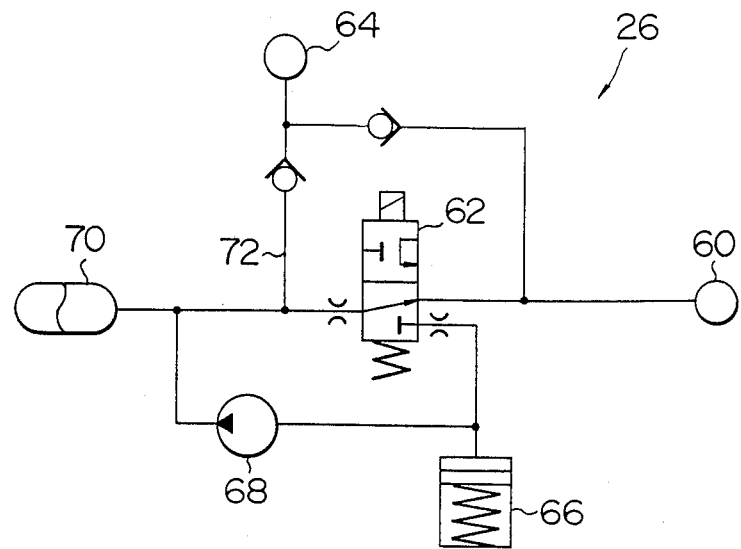
FIG. 2 is a circuit diagram showing one constructional form of the actuator in detial.
Figure 3:
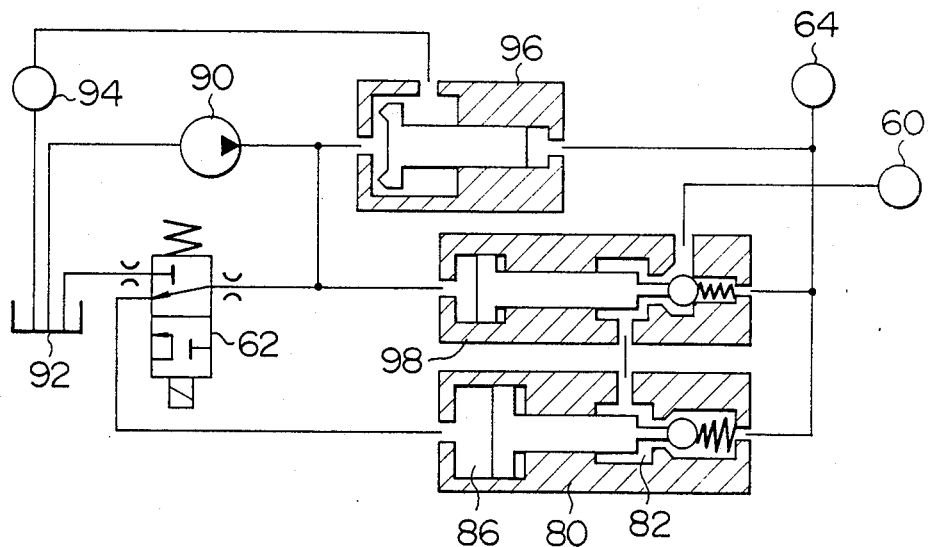
FIG. 3 is a circuit diagram showing another constructional form of the actuator in detail.

The actuator 26 may be either of a reflux type shown in FIG. 2 or of a volume type shown in FIG. 3. This applies to other actuators 28, 30 and 32. The actuators 26, 28, 30 and 32 may be constructed such that they share some component parts with each other.

The actuator 26 of the reflux type shown in FIG. 2 comprises a brake cylinder 60 for actuating the brake 18 which is brought selectively into communication with a master cylinder 64 and a reservoir 66 by an electromagnetic directional control valve 62. The fluid pressure of the brake cylinder 60 rises as a braking fluid is fed from the master cylinder 64 into the brake cylinder 60; the fluid pressure of the brake cylinder 60 falls as the braking fluid is released from the brake cylinder 60 into the reservoir 66. The braking fluid released into the reservoir 66 is delivered by a pump 68 to an accumulator 70 to be stored therein. The braking fluid in the accumulator 70 is allowed to flow back, when necessary, to a main passageway 72 connecting the master cylinder 64 with the brake cylinder 60. This is the reason why this actuator is referred to as a reflux type actuator.

Meanwhile the actuator of the volume type shown in FIG. 3 is designed to increase or decrease the fluid pressure of the brake cylinder 60 by varying the volume of a braking fluid pressure chamber 82 of a regulator 80. The regulator 80 has a power fluid pressure chamber 86 which is selectively brought into communication with a pump 90 and a reservoir 92 by the electromagnetic directional control valve 62. An increase or a decrease in the pressure of the power fluid pressure chamber 86 causes the fluid pressure of the braking fluid pressure chamber 82 or the fluid pressure of the brake cylinder 60 to rise or fall. In the actuator illustrated in FIG. 3, the pump 90 is designed to essentially supply a working fluid to a power steering system 94, so that a regulator 96 normally allows the working fluid delivered by the pump 90 to flow freely toward the power steering system 94. Thus a working fluid pressure is supplied to the power fluid pressure chamber 86 via the electromagnetic directional control valve 62 only when a fluid pressure is generated in the master cylinder 64 as a brake pedal is depressed. At this time, the working fluid pressure is at a level commensurate with the level of the fluid pressure generated in the master cylinder 64. The reference numeral 98 designates a bypass valve which performs the function of supplying, in the event that the pump 90 or other parts might become out of order, the fluid pressure in the master cylinder 64 to the brake cylinder 60 by bypassing the regulator 80.

Figure 4:
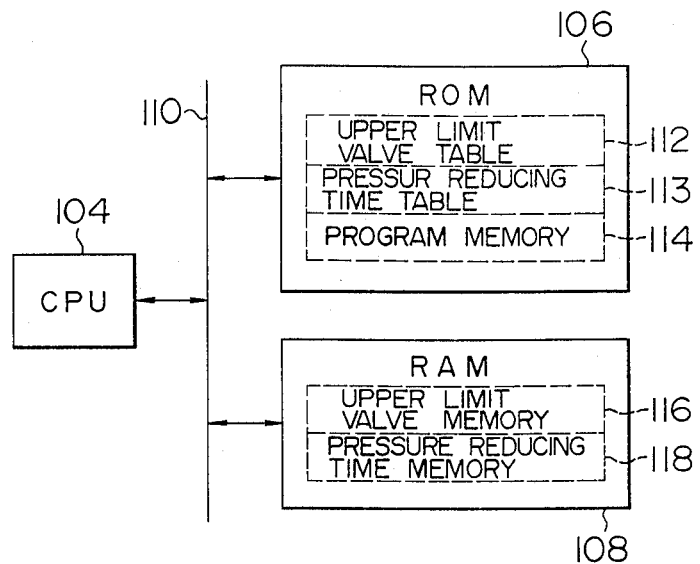
FIG. 4 is a view showing in detail the computer shown in FIG. 1.
Figure 5:
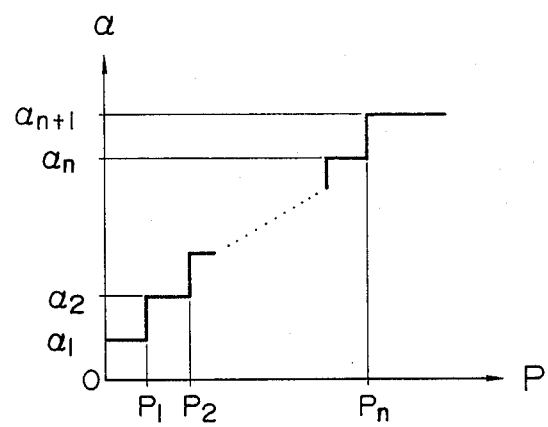
FIG. 5 is a diagram showing the relation between the upper limit value of deceleration and the fluid pressure stored in the upper limit value table shown in FIG. 4.
Figure 6:
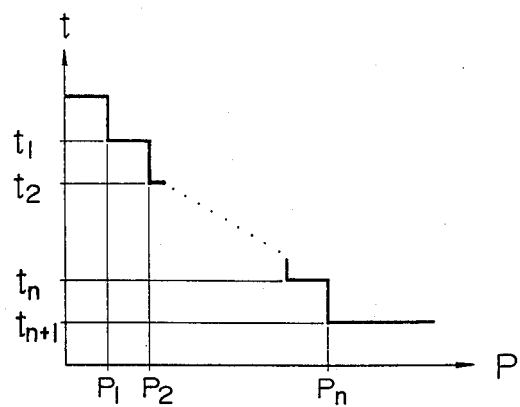
FIG. 6 is a diagram showing the relation between the fluid pressure reducing time and the fluid pressure stored in the fluid pressure reducing time table shown in FIG. 4.
Figure 7:
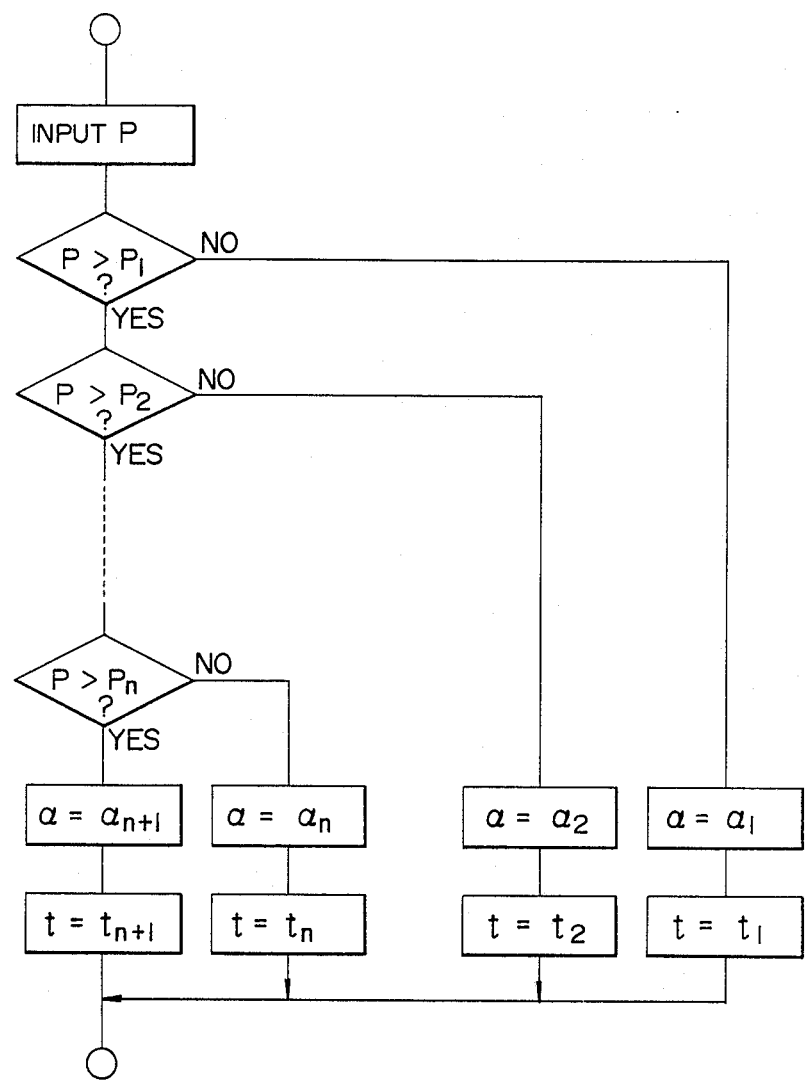
FIG. 7 is a flow chart showing subroutines of the control program stored in the program memory shown in FIG. 4 for deciding the upper limit values of deceleration and the fluid pressure reducing times.

Referring to FIG. 4, the computer 41 comprises a central processing unit (CPU) 104, a read-only memory (ROM) 106, a random-access memory (RAM) 108 and a buss 110. The ROM 106 comprises an upper limit value table 112, a pressure reducing time table 113 and a program memory 114. As shown in FIG. 5, the upper limit value table 112 has stored therein predetermined upper limit values $\alpha_1, \alpha_2 \ldots$ and $\alpha_n$ of deceleration for fluid pressures $P_1, P_2 \ldots$ and $P_n$ respectively. As shown in FIG. 6, the pressure reducing time table 113 has stored therein predetermined pressure reducing times $t_1, t_2 \ldots$ and $t_n$ for the fluid pressures $P_1, P_2 \ldots$ and $P_n$ respectively. The program memory 114 has stored therein a subroutine represented by the flow chart shown in FIG. 7 and a program for controlling the actuators 26, 28, 30 and 32. This program for controlling the actuators is well known and not indispensable for understanding the present invention, so that the description thereof shall be omitted. The RAM 108 comprises an upper limit value memory 116 and a pressure reducing time memory 118 for storing the upper limit values and the pressure reducing times, respectively, that have been set.

Figure 8:
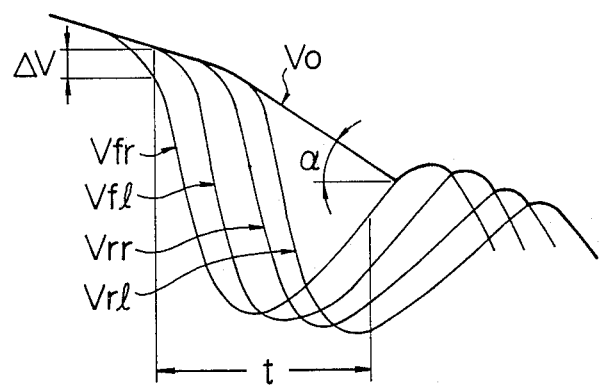
FIG. 8 is a diagram in explanation of the relation between the speed of rotation of each wheel and the estimated traveling speed of the automotive vehicle in the embodiment shown in FIGS. 1-7.

Operation of the brake system of the aforesaid construction will be described by referring to FIG. 8. The notation used in FIG. 8 is as follows:

$V_o$ denotes the estimated traveling speed of an automotive vehicle (which is represented by the speeds of rotation of the wheels).

$V_{fr}$ denotes the speed of rotation of the front right wheel.

$V_{fl}$ denotes the speed of rotation of the front left wheel.

$V_{rr}$ denotes the speed of rotation of the rear right wheel.

$V_{rl}$ denotes the speed of rotation of the rear left wheel.

$\alpha$ denotes the upper limit value of deceleration.

t denotes the pressure reducing time.

When the fluid pressures of the brakes 18, 20, 22 and 24 are raised to apply the brakes, the traveling speed of the automotive vehicle would be reduced while all the wheels are rotating at the same speed unless the braking forces becomes excessively high. However, when the braking forces are excessively high, the speed of each wheel would successively deviate from the traveling speed of the automotive vehicle as shown in FIG. 8. The diagram in FIG. 8 shows the manner in which the speeds of the front right wheel 12, front left wheel 10, rear right wheel 16 and rear left wheel 14 deviate from the traveling speed in the indicated order.

When the speeds of rotation of the plurality of wheels are equal to each other, the computer 41, assuming that the speeds of rotation of the wheels represent the traveling speed of the automotive vehicle, repeatedly performs the operation of comparing the speed of rotation of each wheel with the estimated traveling speed $V_o$ of the automotive vehicle. When the speed of rotation of any wheel becomes lower than the estimated traveling speed $V_o$ by a predetermined value $\Delta V$, computer 41 issues a command to the actuator associated with the particular wheel to reduce fluid pressure. As a result, the fluid pressure of the brake of the particular wheel falls, so that the speed of rotation of the wheel recovers. As soon as the computer 41 issues the pressure reducing command, the subroutine represented by a flow chart shown in FIG. 7 performs an action.

In the example shown in FIG. 8, the speed of rotation $V_{fr}$ of the front right wheel 12 becomes lower than the estimated traveling speed $V_o$ by $\Delta V$ earlier than other wheels. Thus, the fluid pressure sensed by the fluid pressure sensor 36 is fed into the computer 41, and the upper limit value $\alpha$ and the pressure reducing time t are obtained from the upper limit value table 112 and pressure reducing time table 113, respectively, shown in FIG. 4 based on the fluid pressure sensed by the fluid pressure sensor 36. The upper limit value $\alpha$ and pressure reducing time t thus obtained are stored in the upper limit value memory 116 and pressure reducing time memory 118 respectively. Thereafter, the same operation is performed with respect to the front left wheel 10 and rear right wheel 16, and the upper limit values $\alpha$ and reducing times t obtained are stored in the upper limit value memory 116 and pressure reducing time memory 118 respectively. In the upper limit value memory 116, the new upper limit value is stored by replacing the old upper limit value. In the pressure reducing time memory 118, however, the pressure reducing times obtained for different wheels are all stored at separate locations.

If the speed of rotation $V_{rr}$ of the rear right wheel 16 begins to become lower than the speed of rotation $V_{rl}$ of the rear left wheel 14 while the aforesaid operations are being performed, then the rear left wheel 14 is the only wheel that is rotating at the highest speed. When only one wheel becomes the wheel of the highest speed of rotation, the computer 41 performs operations by repeatedly following the steps of the flow chart shown in FIG. 7 at very short intervals with regard to the wheel of the highest speed of rotation or the rear left wheel 14 in this case, so that the upper limit value $\alpha$ and pressure reducing time t obtained in this way are stored in the upper limit value memory 116 and pressure reducing time memory 118 respectively. As described hereinabove, the data stored in the upper limit value memory 116 is renewed each time a new upper limit value $\alpha$ is obtained, but, in the pressure reducing time memory 118, the data on the pressure reducing time is renewed at the location in the memory which is assigned to the rear left wheel 14. Simultaneously as the upper limit value α and pressure reducing time t are thus set, the computer 41 repeatedly performs the operations of calculating the deceleration of the rear left wheel 14, and the operations of estimating the traveling speed of the automotive vehicle by fixing, when the deceleration of the rear left wheel 14 exceeds the upper limit value stored in the upper limit value memory 116, the vehicle deceleration as the upper limit value which is currently obtained. Thus the estimated traveling speed $V_o$ of the automotive vehicle is represented by a straight line sloping with a gradient which is equal to the upper limit value α of the deceleration that is set.

The computer 41 further measures the periods of time that elapse after it begins to issue pressure reducing commands to the actuators 26, 28, 30 and 32 and switches the pressure reducing commands to pressure increasing commands when the periods of time thus measured become equal to the periods of time t stored in the pressure reducing time memory 118.

When the speed of rotation of any of the wheels of the automotive vehicle or the front right wheel 12 in the embodiment shown in FIG. 8 exceeds the estimated traveling speed of the automotive vehicle, the CPU 104 assumes that henceforth the speed of rotation of the front right wheel 12 represents the traveling speed of the automotive vehicle. When the speed of rotation of the front left wheel 10 exceeds the speed of rotation of the front right wheel 12 the next time, the speed of rotation of the front left wheel 10 is assumed to represent the traveling speed of the automotive vehicle.

The CPU 104 functions to control the actuators 26, 28, 30 and 32 by comparing the estimated traveling speed of the automotive vehicle with the speeds of rotation of the wheels 10, 12, 14 and 16 while continuously estimating the traveling speed, so as to control the brakes applied to prevent the wheels from slipping excessively. Because of the fact that the upper limit value of the deceleration is set in conformity with the fluid pressure of the brake applied to the wheel rotating at the highest speed, the value set is very close to the actual deceleration of the automotive vehicle, so that the traveling speed of the automotive vehicle can be estimated with increased accuracy, thereby enabling antiskid control to be effected with increased precision.

The periods of time that elapse after the computer 41 begins to issue pressure reducing commands to the actuators 26, 28, 30 and 32 until the pressure reducing commands are switched to pressure increasing commands are set at suitable levels in conformity with the fluid pressures prevailing when the pressure reducing commands are begun to be issued, so that the fluid pressures of the brakes 18, 20, 22 and 24 are reduced by suitable amounts at all times. Thus the disadvantages that an excessive reduction in fluid pressures results in an increase in the braking distance and that an insufficient reduction in fluid pressures makes it impossible to effect antiskid control with a high degree of precision can be avoided.

From the foregoing description, it will be appreciated that in the embodiment shown and described hereinabove the CPU 104 of the computer 41 and an area of the program memory 114 that stores the antiskid control program constitute a controller, the CPU 104 of the computer 41, the upper limit value table 112, an area of the program memory 114 that stores the upper limit value setting subroutine and the upper limit value memory 116 constitute upper limit value setting means, and the CPU 104, the pressure reducing time table 113, an area of the program memory 114 that stores the pressure reducing time setting subroutine and the pressure reducing time memory 118 constitute pressure reducing time setting means.

In the embodiment shown and described hereinabove, the upper limit value of deceleration is set based only on the braking fluid pressure of the wheel of the highest speed of rotation. However, the invention is not limited to this specific arrangement and the braking fluid pressures of other wheel may also be taken into consideration in setting the upper limit value of deceleration. In the embodiment shown in FIG. 8, for example, the fluid pressures of the brakes 18, 20 and 24 may be stored in a fluid pressure memory, not shown, in the RAM 108 the instant the speeds of rotation of the front left wheel 10, front right wheel 12 and rear right wheel 16 become smaller than the estimated traveling speed $V_o$ of the automotive vehicle by a predetermined value $\Delta V$ and pressure reducing commands are issued. Thus the upper limit value of deceleration can be set at a high level when the fluid pressures are high and high braking forces can be expected to be applied by the brakes as a whole.

In the invention, however, it is not essential that, when the upper limit value of deceleration is set, the fluid pressures of the brakes of other wheels be taken into consideration and that the pressure reducing time be varied in conformity with the level of the fluid pressure at the time the pressure reducing command is issued. These processes are done without in the first embodiment of the invention.

Figure 9:
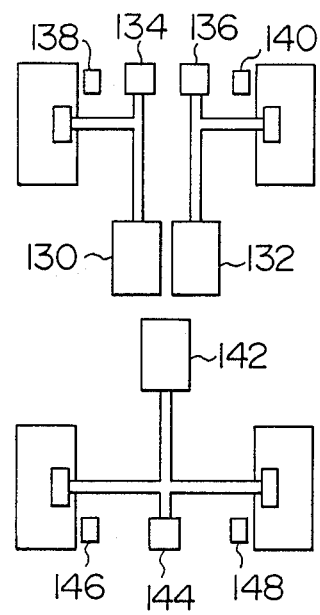
FIGS. 9-11 are views in explanation of the arrangement of the actuators, fluid pressure sensors and rotation sensors in other embodiments of the antiskid type brake system in conformity with the invention.
Figure 10:
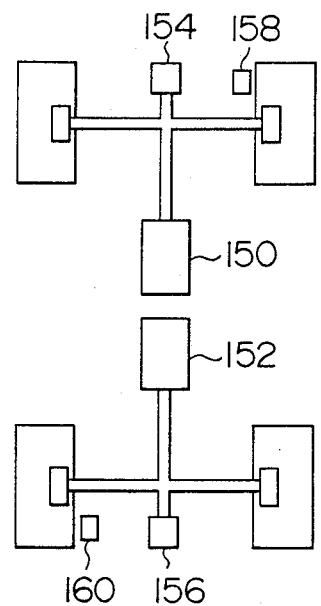
Figure 11:
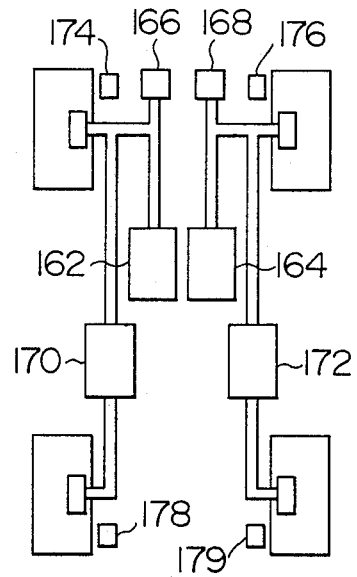

The number of the actuators, fluid pressure sensors and rotation sensors and the positions in which they are mounted may be altered. FIGS. 9–11 show modifications of their arrangement. In a modification of the embodiment shown in FIG. 9, the front left wheel and front right wheel are provided with an actuator 130, a fluid pressure sensor 134 and a rotation sensor 138 and an actuator 132, a fluid pressure sensor 136 and a rotation sensor 140, respectively, for exclusive use. However, the rear left wheel and rear right wheel share one actuator 142 and one pressure sensor 142. Although the rear left wheel and rear right wheel have rotation sensors 146 and 148 respectively, the sensors 146 and 148 may be replaced by a single rotation sensor for sensing the speed of rotation of a propeller shaft.

In a modification shown in FIG. 10, the front left wheel and front right wheel share one actuator 150 and one fluid pressure sensor 154, and the rear left wheel and rear right wheel share one actuator 152 and one fluid pressure sensor 156. The front right wheel and rear left wheel have a rotation sensor 158 and a rotation sensor 160 respectively. However, the rotation sensors may each be mounted to the front left wheel and rear right wheel, and all the four wheels may be each provided with one rotation sensor.

In a modification shown in FIG. 11, the front left wheel and front right wheel have an actuator 162 and a fluid pressure sensor 166 and an actuator 164 and a fluid pressure sensor 168 respectively, and a fluid pressure controlled by the actuator 162 is supplied to the brake of the rear left wheel after having its pressure reduced by means of a proportioning valve 170 while a fluid pressure controlled by the actuator 164 is supplied to the brake of the rear right wheel after having its pressure reduced by means of a proportioning valve 172. The four wheels are each provided with one of rotation sensors 174, 176, 178 and 179. However, it is possible to eliminate the rotation sensors 178 and 179 by setting the braking forces for the rear wheels each at a low level.

It is not essential that the fluid pressure sensors each generate an electric signal which continuously changes in accordance with the fluid pressure (an electric signal that is infinitely variable), and fluid pressure switches whose level changes in two stages depending on whether the fluid pressure is more than a predetermined level or less than that may be used as fluid pressure sensors.

The actuators used may have not only a pressure increasing mode and a pressure reducing mode but also a fluid pressure holding mode. Also, they may have a slow mode and a quick mode for both increasing and reducing pressure.

The brake system according to the invention may have application not only in four-wheeled automotive vehicles but also in two-wheeled automotive vehicles. It will be understood that the invention is not limited to the embodiments shown and described hereinabove and that many changes and modifications may be made therein by persons skilled in the field of art to which the invention pertains without departing from the scope of the invention.

What is claimed is:

1. An anti-skid type brake system for vehicles comprising:
    a plurality of brakes each mounted to one of a plurality of wheels and actuated hydraulically;
    a plurality of actuators each mounted to one of said brakes or a plurality of brakes for increasing and decreasing the fluid pressures of the brakes;
    a plurality of rotation sensors at least one of which is mounted for each one of said plurality of actuators for monitoring the speed of rotation of each said wheel;
    a plurality of fluid pressure sensors each monitoring a fluid pressure supplied from each said actuator to the respective brake and generating an electric signal changing at least in two stages in accordance with the level of the fluid pressure;
    upper limit value setting means for setting an upper limit value of a wheel deceleration at a high level when the fluid pressure is high and at a low level when the fluid pressure is low, based on the fluid pressure sensed by the fluid pressure sensor associated with a wheel whose speed of rotation has been determined by the associated rotation sensor to be the highest of all the speeds of rotation of the wheels; and
    a controller comprising means for normally assuming that the highest speed of rotation of all the speeds of rotation monitored by the rotation sensors represents the traveling speed of a vehicle and for estimating, after the deceleration of a wheel having the highest speed of rotation has exceeded the predetermined upper limit value, the traveling speed of the vehicle by fixing a deceleration of the traveling speed of the vehicle at the upper limit value while controlling each said actuator by estimating the slipping condition of each wheel based on the difference between the estimated traveling speed of the vehicle and the speed of rotation of each wheel, whereby the skidding of at least one of the wheels associated with the actuators is avoided.

2. A brake system as claimed in claim 1, wherein said upper limit value setting means comprises fluid pressure storing means for storing, when any other wheel than the wheel of the highest speed of rotation slips excessively, the fluid pressure of the brake of said other wheel, whereby the upper limit value is set at a high level when the fluid pressure stored in said fluid pressure storing means is high and at a low level when the fluid pressure stored in said fluid pressure storing means is low.

3. A brake system as claimed in claim 1 including pressure reducing time setting means for setting a period of time during which the controller continuously issues a command to reduce pressure to each said actuator in such a manner that such period of time is short when the fluid pressure of each said brake is high at the time the pressure reducing command is initially issued and long when the fluid pressure of each said brake is low at such time.

* * * * *